3,253,989
PROCESS FOR PRODUCING ANOREXIA
Lawrence Robert Moser, Nanuet, N.Y., and Joseph Anthony Kaiser, Oradell, and Robert Allis Hardy, Jr., Ridgewood, N.J., assignors to American Cyanamid Company, Stamford, Conn., a corporation of Maine
No Drawing. Filed Feb. 11, 1963, Ser. No. 257,748
6 Claims. (Cl. 167—55)

This invention relates to new pharmaceutical compositions of matter and more particularly is concerned with novel pharmaceutical compositions having anorexic effects.

The present invention comprises a pharmaceutical composition containing as the essential active ingredient a compound of the formula:

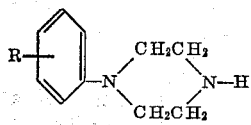

wherein R is hydrogen, meta-chloro para-chloro, meta-methyl, or para-methyl and their parmaceutically acceptable salts and a pharmaceutical carrier therefor.

The active ingredients of the compositions of matter of the present invention, the phenylpiperazines, have been found to be highly useful anorexic agents which are particularly useful in treating obese mammals. They show excellent anorexic action over a range of doses which are non-toxic and possess distinct advantages over other anorexic drugs such as the amphetamines and phenmetrazine.

Amphetamine and closely related compounds such as methamphetamine have been used as central nervous system stimulants and anorexic agents for many years, but numerous undesirable side reactions accompany their administration. For instance, they cause a more or less pronounced rise in blood pressure, and there is a tendency toward developing tolerance and an addiction-like syndrome upon continual use. Phenmetrazine is also an anorexic agent with excitant effects and may produce an addiction-like syndrome. It is also not desirable for patients with hypertension, since it may produce a rise in blood pressure.

The phenylpiperazines, used as active ingredients of the novel compositions of the present invention, are totally different anorexic agents which appear to be safe and free of central nervous system stimulation. They do not have the serious side effects of the amphetamines and phenmetrazine, and may, therefore, be considered markedly superior. They show satisfactory ranges between effective and toxic doses. They are generally equally effective but less toxic than amphetamine, thus demonstrating a greater margin of safety. They are more effective than phenmetrazine. The compositions of this invention do not appear to produce untoward cardiovascular reactions.

The anorexic phenylpiperazines of the present invention are generally oils which are somewhat sparingly soluble in water. They are basic substances which form a variety of mono- or diacidic salts with acids such as hydrochloric, sulfuric, phosphoric, citric, tartaric and the like. These acid addition salts are, generally, freely soluble in water. The preparation of these compounds and their salts is well known to the art.

The active compounds of this invention may be used as free bases or as non-toxic acid addition salts, such as the hydrochloride, sulfate, phosphate, citrate or other similar pharmaceutically acceptable salts. They may be administered orally, or parenterally if desired, and when so administered are useful anorexic agents for reduction of weight at individual doses ranging from about 2 to about 50 milligrams.

The phenylpiperazines of this invention may be incorporated with excipients and used, for example, in the form of tablets, dragees, capsules, suppositories, liquids, elixirs, emulsions, suspension, syrups, chocolate, candy, wafers, chewing gum, or the like. Such compositions and preparations should contain at least 0.1% of active phenylpiperazine. The percentage in the compositions and preparations may, of course, be varied, and may conveniently be between about 2% and 60% or more of the weight of the unit. The amount of active phenylpiperazine in such useful compositions or preparations is such that a suitable dosage will be obtained. Preferred compositions or preparations according to the present invention are prepared so that a dosage unit form contains between about 2 and about 50 milligrams of an active phenylpiperazine.

Tablets, pills, dragees, and the like may contain the following: a binder such as gum tragacanth, acacia, corn starch, or gelatin; a disintegrating agent such as corn starch, potato starch, alginic acid, or the like; a lubricant such as stearic acid, magnesium stearate, talc, or the like; and a sweetening agent such as sucrose or saccharin may be added, as well as a flavoring such as peppermint, oil of wintergreen or cherry flavoring.

A syrup or elixir may contain the active phenylpiperazine in the form of its citrate, for example, and sucrose as a sweetening agent, methyl and propyl parabens as preservatives, a dye, and a flavoring such as cherry or orange flavoring.

In the form of its pamoic acid, alginic acid, tannic acid, or other insoluble salt, an active phenylpiperazine can be made up into one of the various sustained release forms well known to the pharmaceutical art.

The invention will be described in greater detail in conjunction with the following specific examples.

EXAMPLE 1

1-m-chlorophenylpiperazine hydrochloride was administered by gavage or capsules in graded doses to groups of rats and dogs which had been fasted for 18 to 24 hours. Measured quantities of food were offered one hour later, and the food intake was then measured hourly for 5 hours. The dose ($ED_{50}$) which produced a 50% reduction in food intake for the 5-hour testing period compared to parallel controls was calculated. When tested by this procedure in rats, the effective dose ($ED_{50}$) of 1-m-chlorophenylpiperazine hydrochloride for anorexic action was about 6 mg./kg.

The toxic effects of the compounds were determined by orally administering graded doses to groups of rats and calculating that dose ($LD_{50}$) which caused 50% mortality. When tested by this procedure the median lethal dose ($LD_{50}$) of 1-m-chlorophenylpiperazine was about 185 mg./kg.

Comparative testing, by these procedures, indicates that amphetamine shows an $ED_{50}=3$ mg./kg. and an $LD_{50}=25$ mg./kg. Phenemetrazine has an $ED_{50}=25$ mg./kg.

EXAMPLE 2

The testing procedures described in Example 1 were repeated with other active phenylpiperazine. The results obtained are shown in the table below.

Table 1

|  | $ED_{50}$, mg./kg. | $LD_{50}$, mg./kg. |
|---|---|---|
| 1-Phenylpiperazine hydrochloride | 5 | 125 |
| 1-p-Chlorophenylpiperazine hydrochloride | 5 | 120 |
| 1-m-Tolylpiperazine dihydrochloride | 5 | 230 |
| 1-p-Tolylpiperazine dihydrochloride | 7 |  |

EXAMPLE 3

1-m-chlorophenpylpiperazine hydrochloride is incorporated into a standard pharmaceutical tablet according to the following formulation:

|  | Per Tablet, mg. | For 10,000 Tablets (grams) |
| --- | --- | --- |
| 1-m-chlorophenylpiperazine HCl | 5-10 | 50-100 |
| Spray dried lactose | 140 | 1,400 |
| Corn Starch (For mix) | 10 | 100 |
| Corn Starch (For paste) | 10 | 100 |
| Magnesium Stearate | 2 | 20 |
|  | 167-172 | 1,670-1,720 |

The active ingredient, lactose and corn starch (for mix) are blended together. The corn starch (for paste) is suspended in 800 milliliters of water and heated with stirring to form a paste. This paste is then used to granulate the mixed powders. Additional water is used, if necessary. The wet granules are passed through a No. 8 hand screen and dried at 120° F. The dry granules are then passed through a No. 16 screen. The mixture is lubricated with 1% magnesium stearate and compressed into tablets in a suitable tableting machine.

EXAMPLE 4

1-m-chlorophenpylpiperazine hydrochloride is incorporated into a standard pharmaceutical syrup according to the following formulation:

|  | Percent |
| --- | --- |
| 1-m-chlorophenylpiperazine HCl | 0.1-0.2 |
| Sucrose | 40-60 |
| Cherry flavor | 0.1 |
| F.D. and C. Red Dye No. 2 | 0.05 |
| Methyl parabens | 0.08 |
| Propyl parabens | 0.02 |
| Q.s. distilled water. | |

We claim:

1. A process of producing anorexia in obese mammals which comprises administering to said obese mammals an effective amount between the range of about 2 to about 50 milligrams per dosage unit of a member of the class consisting of a compound of the formula:

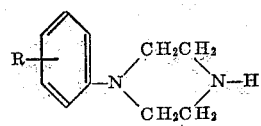

wherein R is a member of the group consisting of hydrogen, m-chloro, p-chloro, m-methyl and p-methyl and a pharmaceutically acceptable salt thereof, and a pharmaceutical carrier therefor.

2. A process according to claim 1 in which the active ingredient is m-chlorophenylpiperazine.

3. A process according to claim 1 in which the active ingredient is phenylpiperazine.

4. A process according to claim 1 in which the active ingredient is p-chlorophenylpiperazine.

5. A process according to claim 1 in which the active ingredient is m-tolylpiperazine.

6. A process according to claim 1 in which the active ingredients is p-tolylpiperazine.

References Cited by the Examiner

Chemical Abst. vol. 42, 1941, page 1942 f.
Pollard: J.A.C.S., vol. 76, April 1954, pages 1853–1855.
Roth, J., Pharm. and Exptl. Ther., vol. 110, No. 2, February 1954, pages 157–165.

JULIAN S. LEVITT, *Primary Examiner.*

FRANK CACCIAPAGLIA, Jr., *Examiner.*